United States Patent [19]
Norris et al.

[11] 3,864,874
[45] Feb. 11, 1975

[54] METHOD AND APPARATUS FOR INTRODUCING A FLUID INTO THE VASCULAR SYSTEM OF A TREE OR SIMILAR PLANT

[76] Inventors: Dale M. Norris, 101 S. Rock Rd.;
John F. Reynolds, 109 Richland Ln., both of Madison, Wis. 53705;
Raymond L. Carroll, 4305 Crawford Dr., Madison, Wis. 53711

[22] Filed: Jan. 29, 1973

[21] Appl. No.: 327,496

[52] U.S. Cl. ............................................... 47/57.5
[51] Int. Cl. .............................................. A01g 7/06
[58] Field of Search ..................... 47/57.5; 128/216; 47/50–54; 222/87

[56] References Cited
UNITED STATES PATENTS

| | | | |
|---|---|---|---|
| 1,756,453 | 4/1930 | Davey et al. | 47/57.5 |
| 1,999,458 | 4/1935 | Hollister | 47/57.5 |
| 3,295,254 | 1/1967 | Schoonman | 47/57.5 |
| 3,310,051 | 3/1967 | Schulte | 128/216 |
| 3,367,065 | 2/1968 | Cravens | 47/57.5 |
| 3,596,402 | 8/1971 | Palmer | 47/53 |
| 3,706,161 | 12/1972 | Jenson | 47/57.5 |

FOREIGN PATENTS OR APPLICATIONS

| | | |
|---|---|---|
| 786,083 | 11/1957 | Great Britain |
| 1,044,498 | 11/1953 | France |

*Primary Examiner*—Robert E. Bagwill
*Attorney, Agent, or Firm*—Michael, Best & Friedrich

[57] ABSTRACT

A countersunk hole is drilled in the trunk of a tree and an implant capsule of generally cylindrical configuration is installed therein. The capsule has a shoulder formed at one end thereof which upon installation becomes seated against a gasket member in the countersunk portion of the hole to seal the capsule in the hole. The capsule is closed at both ends and has at least one opening in the cylindrical sidewall thereof which when installed will be positioned in communication with the sap stream of the tree. A treatment fluid is introduced into the inside of the capsule by inserting a hypodermic needle through a small opening in the exposed end of the capsule and then injecting the treatment fluid therethrough into the capsule.

1 Claim, 5 Drawing Figures

PATENTED FEB 11 1975 3,864,874
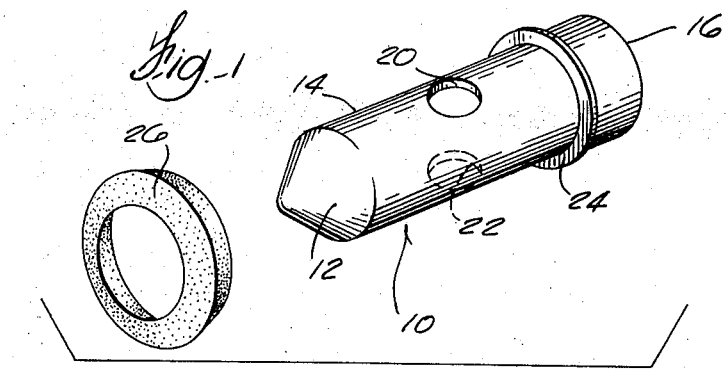
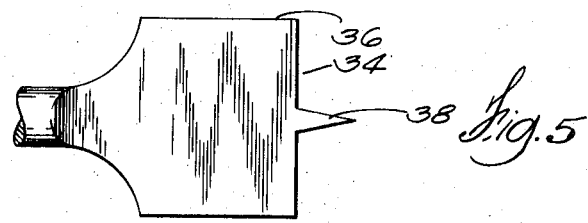
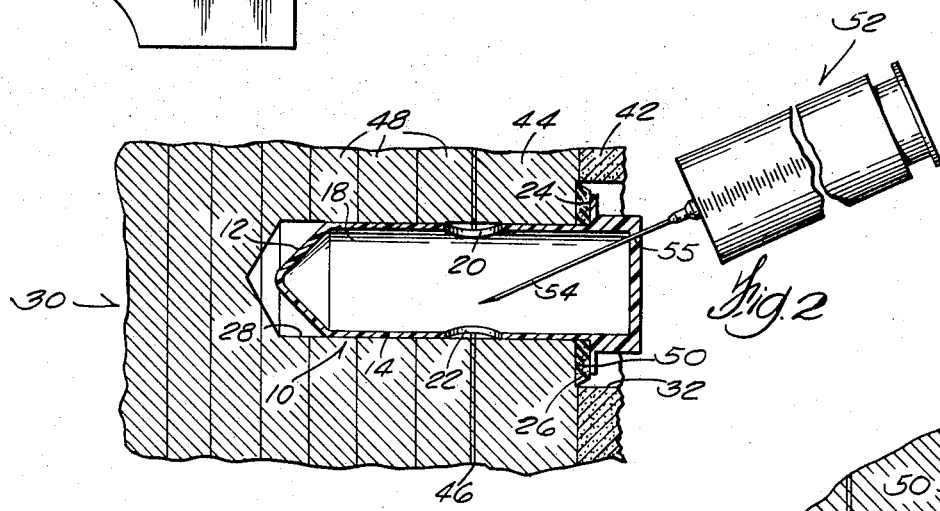
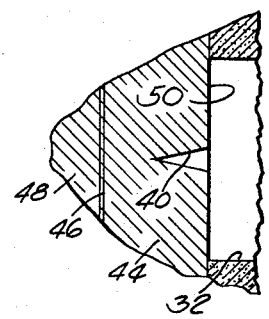
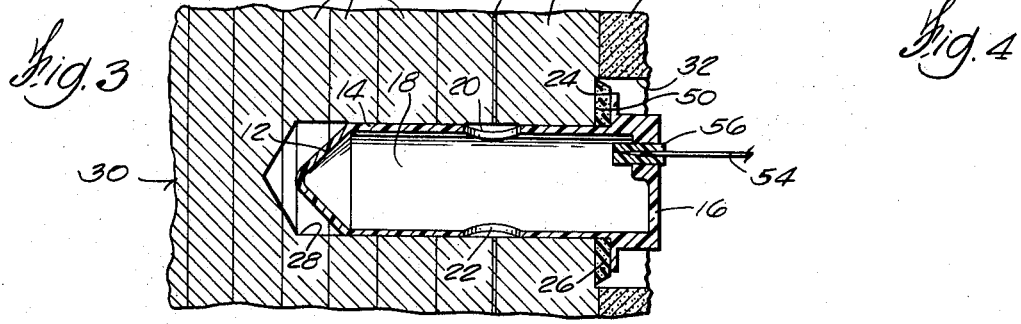

METHOD AND APPARATUS FOR INTRODUCING A FLUID INTO THE VASCULAR SYSTEM OF A TREE OR SIMILAR PLANT

BACKGROUND OF THE INVENTION

I. Field of the Invention

This invention relates to a novel method and apparatus for introducing a treatment fluid into the vascular system of a tree or similar plant.

II. Description of the Prior Art

In most commerically available devices for injecting a treatment liquid into a tree some kind of a feeder tube is driven into the trunk of the tree and then connected with an externally mounted container from which the liquid flows into the vascular system of the tree. Devices of this type are relatively expensive and usually require the services of a professional for installation. Examples of this type of apparatus are shown in U.S. Pat. Nos. 3,254,449, 3,124,904, 2,796,701 and 3,130,519.

The principal object of the present invention is to provide an apparatus which is of simple construction and can be made of relatively inexpensive material so that its overall cost is kept to a minimum. Another important objective of the present invention is to provide a treatment apparatus and procedure wherein the use of the apparatus can be performed by the average homeowner to thereby eliminate the substantial expense of a professional tree surgeon. Further advantages reside in the ability of the apparatus to easily provide for periodic treatment of the tree, using a single initial installation and to do so without the use of externally mounted containers. Another objective is to provide an apparatus and procedure which requires no further manipulation or care once the injections have been made and leaves the treated tree in a condition wherein the presence of the treatment apparatus can be detected only upon close inspection.

SUMMARY OF THE INVENTION

A method of introducing a treatment fluid into the vascular system of a tree comprising a first step of drilling and countersinking a hole in the trunk of a tree. The second step is to insert a cylindrical implant capsule into the hole, said capsule having a shoulder formed on one end thereof which upon installation becomes seated in the countersunk portion of the hole. A gasket member is installed between the shoulder and the countersink to seal the capsule in the hole. The capsule is closed at both ends and has at least one opening in the cylindrical sidewall which when installed will be positioned in communication with the sap stream of the tree. The final step is to introduce a treatment fluid into the implant capsule by inserting a hypodermic needle through a small opening in the exposed end of the capsule and thereafter injecting a treatment fluid therethrough. The treatment fluid thus injected into the capsule will be readily taken up into the sap stream of the tree. In the preferred embodiment the outside diameter of the capsule is dimensioned to be slightly larger than the diameter of the drilled hole to thereby produce a friction fit between the capsule and the wall of the hole. Also in the preferred embodiment the capsule is provided with a pair of diametrically opposed openings, the axis of which extends substantially vertically when the capsule is installed in the drilled hole.

DESCRIPTION OF THE DRAWINGS

FIG. 1 is an exploded perspective view of a systemic implant capsule and gasket member constructed in accordance with the present invention;

FIG. 2 is a sectional view taken through a systemic implant capsule with the capsule positioned in its operative position in the trunk of a tree;

FIG. 3 is a view similar to FIG. 2 but showing an implant capsule of somewhat different design;

FIG. 4 is a fragmentary sectional view taken through the tree trunk showing the countersink made prior to the drilling of the reservoir hole; and FIG. 5 is a fragmentary side view of a conventional wood boring bit of the type employed in the performance of the preferred treatment procedure of the present invention.

DESCRIPTION OF THE PREFERRED EMBODIMENT

As indicated previously, this invention relates to a method and apparatus for introducing a liquid treatment chemical into the sap stream or vascular system of a tree wherein the apparatus is of reasonable cost and the method is simple to perform. As shown in FIG. 1, the implant apparatus includes a systemic implant capsule 10 preferably made of a transparent molded plastic material. The plastic material utilized may be of any suitable type which is not toxic to the tree and is inert to the treatment chemical with which it is used. The capsule 10 is of generally cylindrical configuration, having a closed tip portion 12, a body portion 14, and a head portion 16. Portions 12, 14 and 16 can be formed integrally with each other as shown in the drawings or can be made from separate parts which are bonded or fastened together in any suitable manner. The three portions 12, 14 and 16 together define an enclosed reservoir space 18 in the interior thereof. Capsule body portion 14 is provided with a pair of diametrically opposed openings 20 and 22 and an annular shoulder 24 formed at the head end of the body portion.

The implant apparatus also includes a gasket member 26 of resilient material which is dimensioned to fit snugly around body portion 14 of the capsule adjacent shoulder 24 as shown in FIG. 2. While gasket member 26 may be made of different types of resilient material in the preferred embodiment it is made of closed cell neoprene rubber.

The method of introducing a liquid treatment chemical into the sap stream of a tree by the use of the apparatus of this invention includes several steps. The first step is to drill a countersunk reservoir hole 28 in the trunk 30 of the tree. The countersunk portion of the hole is indicated by reference numeral 32. The drilling of the hole is accomplished most expeditiously by first drilling the countersink 32 as shown in FIG. 4 with a wood boring bit 34 of conventional design (FIG. 5), having a main cutter portion 36 and a starting tip 38. The hole 28 is then drilled with a smaller size bit using the small center hole 40 (left by bit tip 38) as a starting guide. This procedure will make it easier for the operator to accurately center hole 28 with respect to countersink 32 than would be the case if the hole were drilled first and then the countersink were made.

In the preferred embodiment the countersink 32 is drilled through the outer bark layer 42 of the tree to the outer surface of the phloem layer 44 which will appear to the operator as live greenish-white tissue. Thus, as soon as the material being cut out of the hole 32 starts to turn from the dark colored bark material to the light colored phloem material the operator will know that countersink hole 32 has reached its proper depth. Reservoir hole 28 is drilled through the phloem layer 44, the very thin cambium layer 46 and into the xylem or functional sapwood layers 48 adjacent cambium layer 46. The ultimate depth of hole 28 must be of sufficient depth to accommodate the body and tip portions 14 and 12 of capsule 10, it being unnecessary and undesirable to make the hole of any appreciable depth beyond that shown in FIGS. 2 and 3. In the preferred embodiment the axis of the drilled hole 28 is in a horizontal plane. However, slight deviations from the horizontal would produce no appreciable adverse effects.

After the countersunk hole is properly drilled, as described above, the next step is to install capsule 10 (with gasket 26) in the hole 28. This is accomplished by inserting the tip portion 12 into hole 28 and then driving the capsule into the hole by gently tapping on head portion 16 with any suitable tool such as a small wooden or rubber mallet. This insertion procedure is performed with the capsule positioned so that the centerline axis of openings 20 and 22 will extend in a substantially vertical direction so that the capsule will ultimately assume the position shown in FIG. 2. The capsule is driven into the hole until gasket 26 becomes snugly seated between shoulder 24 on the capsule and the shoulder 50 formed between hole 28 and countersink 32. With the capsule thus installed, the center of vertically aligned openings 20 and 22 will be in substantial alignment with the cambium layer 46 of the tree and will thus overlap into both the adjacent xylem layer 48 and phloem layer 44. In most trees of the type treated by the method and apparatus of this invention a distance in the range of one-half inch to five-eighths inch between shoulder 24 and the center line of openings 20,22 will bring such openings into alignment with the cambium layer 48 when following the installation procedure set forth above. In other words in trees of the type treated by the present method the radial distance between the outer face of the phloem layer 44 and the cambium layer 46 is about three-eighths inch to one-half inch which range allows about one-eighth inch for the thickness of gasket 26.

The outside diameter of body portion 14 of capsule 10 is dimensioned to be slightly larger than the diameter of hole 24 to produce a friction fit between the capsule and the walls of hole 24 so that the capsule will be firmly retained in the hole in which it is installed. This will insure firm retention of gasket 26 between shoulders 24 and 50 and will deter unauthorized removal of a capsule from the tree trunk. As an example of one commercially usable embodiment of the present invention, countersink 32 and hole 28 are drilled with 1 inch and 17/32 inch drill bits, hole 28 is drilled to a depth of about 2 inches and body portion 14 has an outside diameter of nine-sixteenths inch.

The next step in the treatment procedure is to introduce a volume of treatment fluid (not shown) into the reservoir space 18 inside the capsule 10. In the preferred embodiment this is accomplished by the use of a hypodermic syringe 52 of conventional design. After the syringe is filled with the treatment fluid, the injection needle 54 thereof (preferably 19-gauge) is forced through the end wall of head portion 16 at the top portion thereof as shown in FIG. 2, creating a small opening 55 therein. The syringe 52 is then actuated to inject the desired amount of fluid into the capsule and is then remove. During such injection the air in the space 18 which is displaced by the treatment liquid will escape out the opening 55. It is generally advantageous to first puncture the end wall with an old syringe needle since the plastic material tends to clog the needle used to make the puncture. The treatment fluid introduced into space 18 will flow therefrom through one or both of openings 22 and 20 into the vascular system of the tree. During this step of the treatment procedure gasket 26 serves to prevent any tendency of the treatment fluid to leak out the open end of hole 28.

It will be appreciated that the openings in head 16 through which injection needle 54 extends can be made either by a needle or some other suitable instrument after the capsule is installed, as described above, or the head could be pre-punctured prior to installation in which event care must be taken by the operator so that the opening will end up at the top of the drilled hole as shown in FIG. 2.

The treatment procedure set forth above covered only the installation and treatment use of a single implant capsule. It should be understood, however, that the complete treatment of any particular tree will require the use of a number of capsules. As an example of one commercially useful procedure, capsules of the type and size described above are installed around the trunk circumference at 5 inch intervals and each capsule is injected with approximately 4 ml of the treatment liquid.

The fluid injected into the capsule will be taken into the vascular system of the tree in a relatively short period of time. Most of the flow from space 18 into the tree will take place through the bottom opening 22. While there may be some limited flow out through opening 20 (primarily when the capsule is completely filled) opening 20 also serves to permit sap from the tree to flow into the capsule through opening 20 and then out through opening 22. Such flow serves to "flush out" space 18 to insure a substantially complete transmittal of all the treatment material into the vascular system of the tree. This flushing action is of particular importance when using a treatment fluid comprising a slurry of a liquid with solid particles suspended therein. Any tendency of the solid particles to settle out and be retained in the capsule will be minimized by the flushing action described above. The capsule can be left in its installed position in the trunk of the tree, thus permitting subsequent injections of the treatment chemical at periodic intervals. This is a very advantageous feature since in many instances the most effective treatment procedure requires several treatments throughout one and sometimes two growing seasons. With the present invention such subsequent treatments can be made very readily by simply repeating the injection procedure described above without any additional treatment steps such as the installation of additional injection instruments each time a treatment is made.

Referring now to the implant capsule shown in FIG. 3, such capsule is substantially identical to the capsule previously described. It will be noted that all parts of the two capsules which are identical have been labeled with identical reference numerals. The modification shown in FIG. 3 relates to the provision of a septum member 56 mounted in the head portion 16 of the capsule. The septum is mounted at the outer edge of head 16 opposite one of the two openings in body portion 14 so that upon proper installation it will be positioned as shown in FIG. 3. The septum 56 is made from a resilient material of the type which will tend to spring back to its original shape after syringe needle 54 is inserted through it. Examples of such a material are closed cell neoprene and closed cell plastic foam. Thus, after the needle is removed from the capsule upon completion of the infection step, the material of septum 56 will spring back to its original shape and thus close off the opening made by the needle. This arrangement provides a completely leakproof capsule.

After the tree is treated as described above, the exposed ends of capsules 10 can be painted with a suitable protective coating. No further attention is necessary. The presence of a set of implant capsules in the tree can hardly be detected and thus the appearance of the tree is not adversely affected.

It will be apparent from the foregoing that the implant method and apparatus of the present invention provides several important advantages. First, the apparatus required is of simple construction and can be made of relatively inexpensive materials so that its overall cost is kept to a minimum. Secondly, the treatment procedure involved is simple enough so that with a reasonable amount of care and skill it can be performed by the average home owner, thus eliminating the substantial expense of a professional treatment. Further advantages reside in its ability to easily provide for periodic treatment using a single initial installation, its ability to do so without the use of externally mounted reservoirs, etc., and the fact that the apparatus can be installed and used in any season and in any type of weather. Finally, the treatment apparatus and procedure requires no further treatment once the injections have been made and leaves the treated tree in a condition wherein the presence of the implant capsules can be detected only upon close inspection.

We claim:

1. A method of introducing a treatment fluid into the vascular system of a tree comprising the following steps:
   a. drilling and countersinking a cylindrical hole in the trunk of a tree, said countersink drilled through the bark of the tree to the phloem layer of the tree;
   b. inserting a cylindrical implant capsule into the hole, said capsule having an annular shoulder formed at one end thereof and a gasket member mounted on the capsule adjacent said annular shoulder, said gasket upon installation becoming seated in the countersunk portion of the hole, said capsule being closed at both ends and having at least one opening in the cylindrical side wall portion thereof positioned in communication with the sap stream of the tree, said cylindrical hole drilled in the tree having a diameter slightly smaller than the outside diameter of the capsule to produce a friction fit between the capsule and the wall of the hole; and
   c. introducing a treatment fluid into the implant capsule by puncturing the exposed end of the capsule to make a small opening therein and then inserting a tubular member through said small opening and injecting the treatment fluid therethrough into the capsule, said small opening located in the upper portion of the exposed end of the capsule.

* * * * *